United States Patent
Wang

(10) Patent No.: US 11,602,826 B2
(45) Date of Patent: Mar. 14, 2023

(54) ELECTRIC APPARATUS AND CONTROL METHOD THEREOF

(71) Applicant: Te Huang Wang, New Taipei (TW)

(72) Inventor: Te Huang Wang, New Taipei (TW)

( * ) Notice: Subject to any disclaimer, the term of this patent is extended or adjusted under 35 U.S.C. 154(b) by 129 days.

(21) Appl. No.: 17/379,769

(22) Filed: Jul. 19, 2021

(65) Prior Publication Data

US 2023/0020579 A1 Jan. 19, 2023

(51) Int. Cl.
*B25B 23/00* (2006.01)
*B25B 21/00* (2006.01)
*G01D 21/02* (2006.01)
*G01L 5/24* (2006.01)

(52) U.S. Cl.
CPC ............ *B25B 21/008* (2013.01); *B25B 23/00* (2013.01); *G01D 21/02* (2013.01); *G01L 5/24* (2013.01)

(58) Field of Classification Search
CPC ....... B25B 23/147; B25B 23/14; B25B 21/00; B25B 21/002; B25B 23/1475; B25B 23/1425; H02P 2205/05
USPC ................... 173/2, 5, 176, 181, 217
See application file for complete search history.

(56) References Cited

U.S. PATENT DOCUMENTS

| | | | |
|---|---|---|---|
| 2012/0255756 A1* | 10/2012 | Aoki | B25F 5/00 173/181 |
| 2013/0269961 A1* | 10/2013 | Lim | B25B 23/147 173/1 |
| 2015/0336248 A1* | 11/2015 | Goe | B25B 21/00 173/180 |
| 2017/0190032 A1* | 7/2017 | Leong | B25F 5/00 |
| 2018/0215038 A1* | 8/2018 | Ueda | B25J 9/1633 |

\* cited by examiner

*Primary Examiner* — Andrew M Tecco
*Assistant Examiner* — Jacob A Smith
(74) *Attorney, Agent, or Firm* — Birch, Stewart, Kolasch & Birch, LLP

(57) ABSTRACT

The electric screwdriver apparatus control method is executed by an electric screwdriver apparatus. A processing module of the electric screwdriver apparatus loads a configuration data, and the processing module controls a motor module to accelerate a rotational speed to a target rotational speed. When a revolution number exceeds a first revolution number, the processing module controls the motor module to decelerate to a first rotational speed. When a torque value exceeds a first torque value, the processing module determines whether a fastening process of a screw ends with a hard stop or a soft stop according to the configuration data. If the fastening process ends with the hard stop, then the screw is additionally tightened for a hard stop angle, vice versa. The processing module tightens the screw according to the configuration data, the torque value and a rotational speed value, improving the process of fastening the screw.

11 Claims, 4 Drawing Sheets

ELECTRIC APPARATUS AND CONTROL METHOD THEREOF

BACKGROUND OF THE INVENTION

1. Field of the Invention

The present invention relates to an electric screwdriver, more particularly an electric screwdriver apparatus and control method thereof.

2. Description of the Related Art

Most commercial equipment use screws to ensure structural stability, and most industries rely on electric screwdrivers to fasten screws in places. As technology advances, more and more precision equipment demand precise fastening of screws with controlled strength and time, for precise control over how those screws are fastened in places and for quality control over those precision equipment.

However, most conventional electric screws are not precise enough in fastening and generating torque; more particularly, most conventional electric screw drivers start fastening as a user presses on a start button and only stops when a screw is completely tightly fastened. During the process, although the user loosely controls a rotational speed of the conventional screwdriver, a torque value of the conventional screwdriver is fixed. This kind of fastening process may do damage to a screw hole when a thread of the screw is not aligned properly and is forcibly screwed, causing the screw to strip. This kind of fastening process also cannot produce uniform end results, as screws are each fastened with different initial conditions, and hence the final conditions for each of the screws are different.

The user also contributes to a human error factor, as the user is not able to perfectly control the rotational speed of the conventional screwdriver by adjusting pressing strength on the start button. This problem is amplified when the screw is almost fastened, as at this very moment the screw requires fine control of the rotational speed and a rotating angle. The conventional electric screw driver cannot execute such fine fastening actions.

As an example, a circular valve has 30 screws equidistantly placed around the rim, and the 30 screws should be fastened uniformly to prevent a high pressure gas leak. If the 30 screws cannot be fastened uniformly, then the valve cannot be closed completely, and can cause leakage. To fasten all 30 screws manually is extremely exhausting, and to use the conventional electric screwdriver for fastening can cause damaged thread, stripped screws, and inconsistent end results due to its inability to perform fine fastening actions.

SUMMARY OF THE INVENTION

To improve upon the aforementioned problems, the present invention provides an electric screw driver apparatus and control method thereof. The present invention provides a way to precisely control fastening strength and rotational speed of a fastening process, ensuring all screws are uniformly fastened.

An electric screwdriver apparatus of the present invention includes an electric screwdriver and a controller. The electric screwdriver is electrically connected to the controller, and the controller controls the electric screwdriver.

The electric screw driver further includes a screwdriver shell, a rotating shaft, a starting switch, a motor module, and a sensing module. The screwdriver shell includes a hole. The rotating shaft is mounted inside the screwdriver shell, and the rotating shaft protrudes out through the hole. The starting switch is mounted on the screwdriver shell. The motor module is mounted inside the screwdriver shell, for driving the rotating shaft to rotate. The sensing module is also mounted inside the screwdriver shell, for sensing a rotation time, a rotational speed, and a torque from the rotating shaft, and for accordingly generating a rotation time signal, a rotational speed signal, and a torque signal.

The controller further includes a controller shell, a processing module, and a memory module. The processing module is mounted inside the controller shell, and the processing module is electrically connected to the motor module and the sensing module of the electric screwdriver. The processing module receives the rotation time signal, the rotational speed signal, and the torque signal generated by the sensing module, and the processing module accordingly calculates a torque value from the torque signal. The processing module further calculates the rotation time, a rotational speed value, and a revolution number from the rotation time signal and the rotational speed signal. The memory module is electrically connected to the processing module and the memory module is mounted inside the controller shell. The memory module stores a configuration data.

The processing module is electrically connected to the starting switch. When the processing module detects a starting signal from the starting switch, the processing module starts controlling the rotating shaft to fasten a screw according to the configuration data from the memory module.

Further, after loading the configuration data, the processing module controls the motor module to accelerate to a target rotational speed. When the revolution number exceeds a first revolution number from the configuration data, the processing module controls the motor module to decelerate to a first rotational speed. When the torque value exceeds a first torque value from the configuration data, the processing module determines whether the fastening process ends with a hard stop or a soft stop. If determining to end with the hard stop, then the processing module controls the motor module to additionally fasten the screw for a hard stop angle before stopping. If determining to end with the soft stop, then the processing module controls the motor module to additionally fasten the screw for a soft stop angle before stopping.

An electric screwdriver apparatus control method of the present invention is executed by a controller of an electric screwdriver apparatus. The electric screwdriver apparatus control method includes the following steps:

Step S1: loading a configuration data from a memory module;

Step S2: accelerating a rotational speed of a motor module of an electric screwdriver of the electric screwdriver apparatus to a target rotational speed according to a target rotational speed signal from the configuration data;

Step S3: calculating a revolution number according to a rotation time signal and a rotational speed signal from the sensing module, and determining whether the revolution number exceeds a first revolution number from the configuration data;

Step S4: when the revolution number exceeds the first revolution number, controlling the rotational speed of the motor module to decelerate to a first rotational speed according to a first rotational speed signal from the configuration data, wherein the first rotational speed is slower than the target rotational speed;

Step S5: according to a torque value sensed by the sensing module, determining whether the torque value exceeds a first torque value from the configuration data.

Step S6: when the torque value exceeds the first torque value, determining whether a fastening process of a screw ends with a hard stop or a soft stop according to the configuration data;

Step S7: when the fastening process is determined to end with the hard stop, controlling the motor module of the electric screwdriver of the electric screwdriver apparatus to stop fastening the screw after additionally fastening for a hard stop angle according to the configuration data; and Step S8: when the fastening process is determined to end with the soft stop, controlling the motor module of the electric screwdriver of the electric screwdriver apparatus to stop fastening the screw after additionally fastening for a soft stop angle according to the configuration data, wherein the soft stop angle is wider than the hard stop angle.

The processing module of the present invention controls the rotating shaft to fasten the screw according to the target rotational speed signal, the first revolution number, the first rotational speed signal, the first torque value, and the determination of whether the fastening process ends with the hard stop or the soft stop from the configuration data. The processing module further precisely controls the fastening process of the screw according to the torque value, the rotation time, the revolution number, and the rotational speed acquired. The present invention digitally improves a fineness of the fastening process, and strengthens quality control over the fastening process of the screw.

DETAILED DESCRIPTION OF THE INVENTION

The present invention details an electric screwdriver apparatus and control method thereof.

Figure 1:
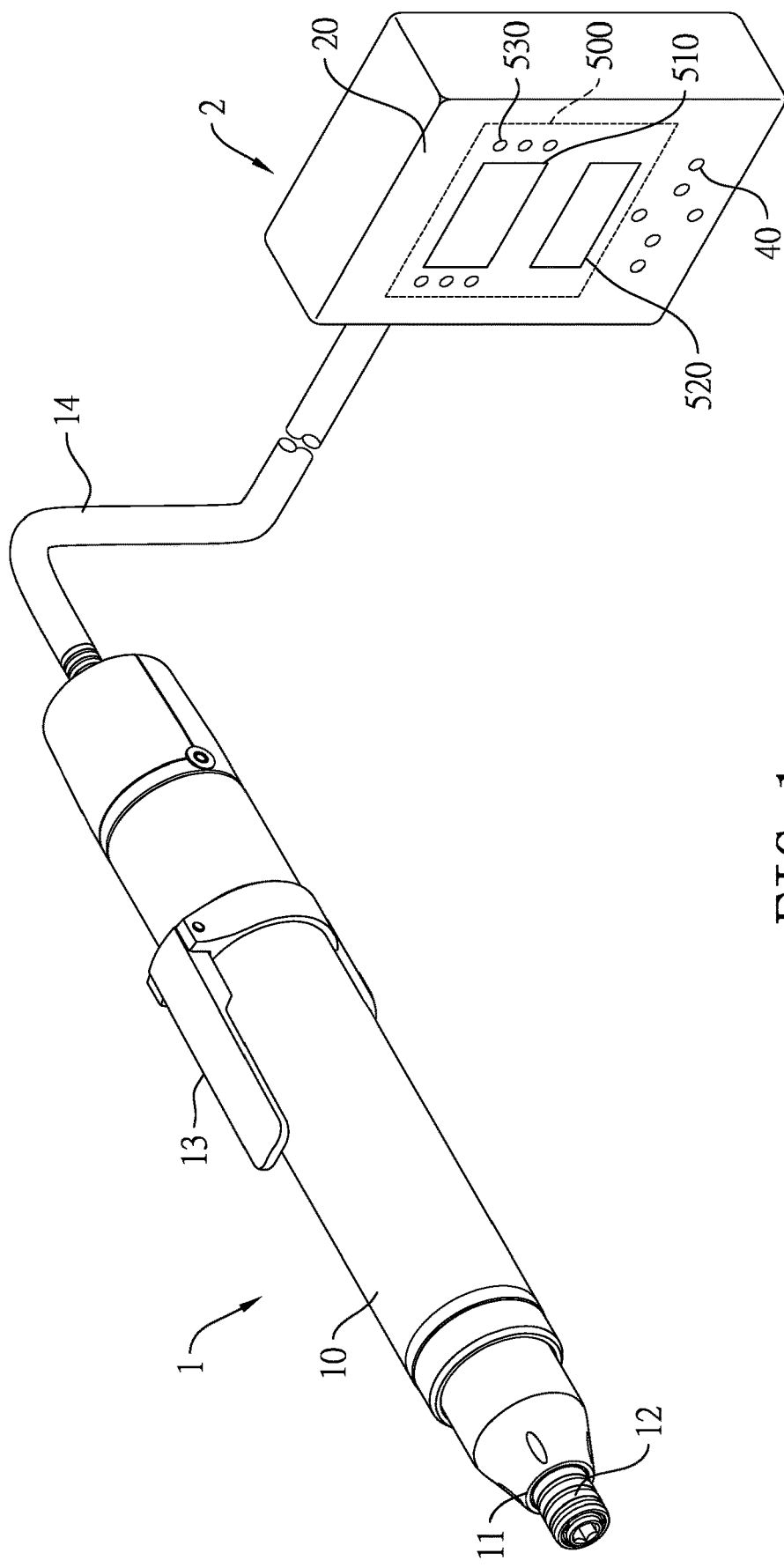
FIG. 1 is a perspective view of a first embodiment of an electric screwdriver apparatus of the present invention.

With reference to FIG. 1, an electric screwdriver apparatus of the present invention includes an electric screwdriver 1 and a controller 2. The electric screwdriver 1 is electrically connected to the controller 2, and the controller 2 controls the electric screwdriver 1. In FIG. 1, a first embodiment of the electric screwdriver apparatus of the present invention has the electric screwdriver 1 electrically connected to the controller 2 via a cable 14.

Figure 2:
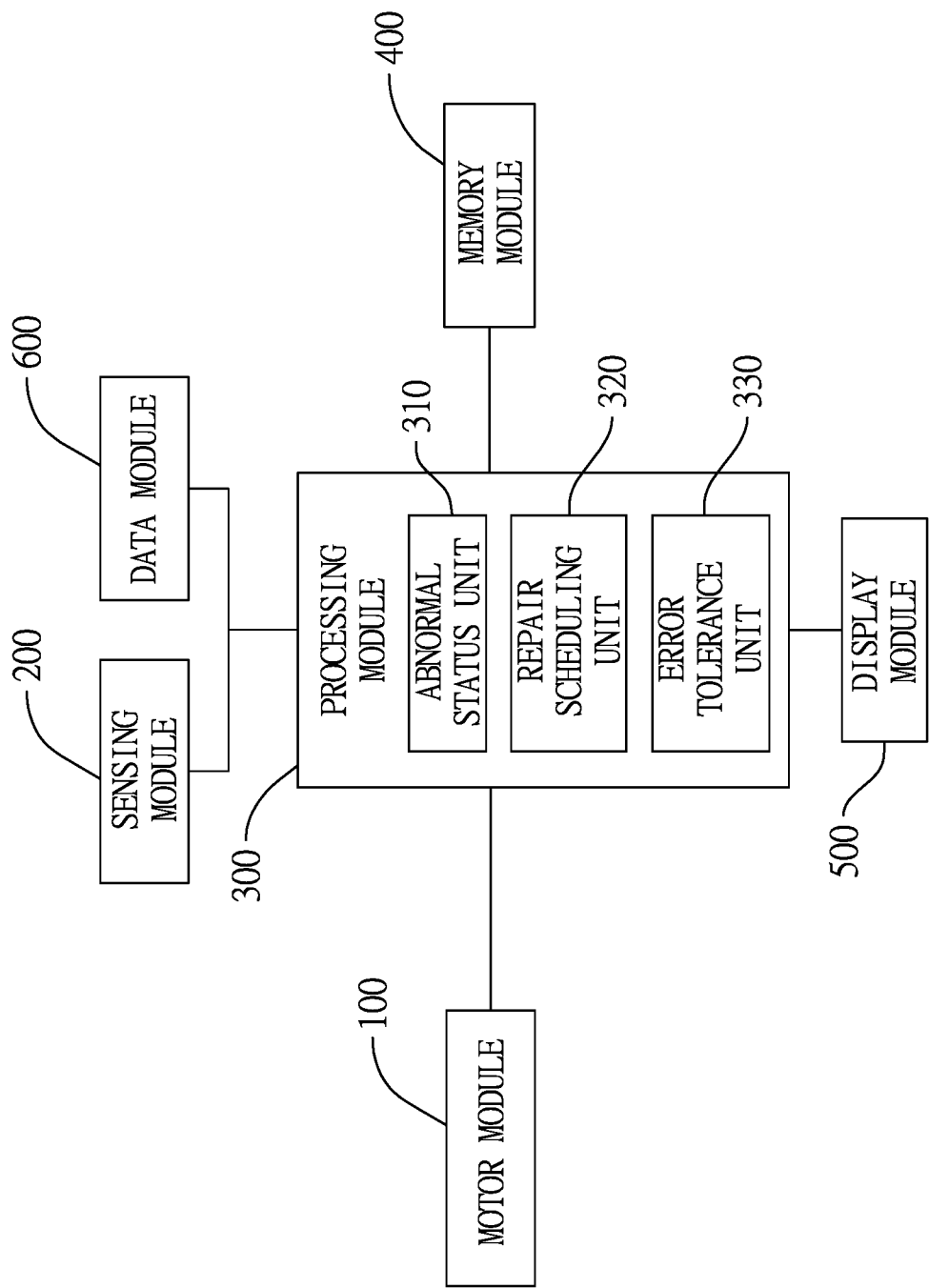
FIG. 2 is a block diagram of the first embodiment of the electric screwdriver apparatus of the present invention.

With reference to FIG. 2, the electric screwdriver 1 further includes a screwdriver shell 10, a rotating shaft 12, a starting switch 13, a motor module 100 and a sensing module 200. The screwdriver shell 10 includes a hole 11. The rotating shaft 12 is mounted inside the screwdriver shell 10, and the rotating shaft 12 protrudes out through the hole 11.

The motor module 100 is mounted inside the screwdriver shell 10, for driving the rotating shaft 12 to rotate. The sensing module 200 is also mounted inside the screwdriver shell 10, for sensing a rotation time, a rotational speed, and a torque from the rotating shaft 12, and for accordingly generating a rotation time signal, a rotational speed signal, and a torque signal.

The controller 2 further includes a controller shell 20, a processing module 300, and a memory module 400. The processing module 300 is mounted inside the controller shell 20, and the processing module 300 is electrically connected to the motor module 100 and the sensing module 200 of the electric screwdriver 1. The processing module 300 receives the rotation time signal, the rotational speed signal, and the torque signal generated from the sensing module 200. The processing module 300 then accordingly calculates a torque value from the torque signal, and the processing module 300 further calculates the rotation time, a rotational speed value, and a revolution number from the rotation time signal and the rotational speed signal. The rotational speed value is obtained by measuring the rotational speed of the rotating shaft 12, and the torque value is obtained by measuring the torque of the rotating shaft 12.

The memory module 400 is electrically connected to the processing module 300, and the memory module 400 is mounted inside the controller shell 20. The memory module 400 stores a configuration data, and the configuration data includes a fastening plan for a screw. In particular, the fastening plan of the configuration data is a basis of how the processing module 300 of the controller 2 controls the motor module 100 to drive the rotating shaft 12. The fastening plan includes a target rotational speed signal, a first revolution number, a first rotational speed signal, a first torque value, and a determination of whether a fastening process ends with a hard stop or a soft stop. These information will be discussed in later parts.

The starting switch 13 is mounted on the screwdriver shell 10, and the starting switch 13 is also electrically connected to the processing module 300. When the starting switch 13 is pressed by an external force, the starting switch 13 generates a starting signal. When the processing module 300 detects the starting signal generated by the starting switch 13, the processing module 300 controls the rotating shaft 12 for fastening the screw according to the configuration data from the memory module 400.

After loading the configuration data, the processing module 300 controls the motor module 100 to accelerate the rotational speed to a target rotational speed with respect to the rotational speed value continuously calculated by the processing module 300. When the revolution number exceeds a first revolution number from the configuration data, the processing module 300 controls the motor module 100 to decelerate the rotational speed to a first rotational speed. When the torque value exceeds the first torque value from the configuration data, the processing module 300 determines whether the fastening process ends with the hard stop or the soft stop. If the fastening process is determined to end with the hard stop, then the processing module 300 controls the motor module 100 to stop fastening the screw after additionally fastening for a hard stop angle. If the fastening process is determined to end with the soft stop, then the processing module 300 controls the motor module 100 to stop fastening the screw after additionally fastening for a soft stop angle.

The hard stop and the soft stop are defined to describe when the screw is fastened, in other words when the torque value exceeds the first torque value from the configuration data, how many more degrees of angle can the screw be fastened so that the screw is even more tightly fastened to a surface. When the screw is fastened, a reaction force of the screw against a screwing force will increase, causing the torque value to increase and exceed the first torque value from the configuration data. How many more degrees of angle can the screw be fastened is defined by how many more degrees of angle can the rotating shaft 12 rotate. The hard stop after the torque value exceeds the first torque value means the screw is able to rotate only less than one revolution. The soft stop after the torque value exceeds the first torque value means the screw is able to rotate more than one revolution.

In the first embodiment of the present invention, the hard stop angle is less wide than the soft stop angle. The hard stop angle is roughly around 30 degrees, and the soft stop angle is roughly around 720 degrees. In other words, after the screw is fastened, with a soft stop the screw can be additionally fastened for two more revolutions.

Further, in the first embodiment of the present invention, the controller 2 further includes a display module 500. The display module 500 is mounted in the controller shell 20, and the display module 500 is electrically connected to the processing module 300. The display module 500 displays the configuration data and values such as the rotational speed value, the torque value, the rotation time, and the revolution number from the processing unit 300.

With reference to FIG. 1, in the first embodiment of the present invention, the display module 500 includes a torque value display 510, a configuration data display 520, and multiple status lights 530. The torque value display 510 is tasked to only display the torque value, as monitoring torque value changes when fastening the screw is very important and demands a dedicated monitor exclusively for displaying the torque value. Those status lights 530 are mounted on two opposite sides of the torque value display 510, and those status lights 530 indicate current status of the screw, such as whether the rotating shaft 12 is rotating, or whether the torque value exceeds a threshold the motor module 100 is able to handle, etc. The configuration data display 520 is tasked to display the configuration data. In the first embodiment, the configuration data display 520 and multiple configuration buttons 40 mounted on the controller shell 20 receive the configuration data being inputted. Those configuration buttons 40 are each electrically connected to the processing module 300. The configuration buttons 40 allow the configuration data displayed in the configuration data display 520 to be selected and modified.

In the first embodiment, the controller 2 further includes a data module 600. The data module 600 is mounted inside the screwdriver shell 10 and is electrically connected to the sensing module 200 and the processing module 300. The data module 600 receives the rotation time signal, the rotational speed signal, and the torque signal, and digitizes each signal respectively. After digitization, the data module 600 outputs the rotation time signal, the rotational speed signal, and the torque signal to the processing module 300, easing burden for the processing module 300 to process and digitize the rotational speed signal and the torque signal.

In the first embodiment, the motor module 100 is a brushless direct current motor (BLDC Motor). The sensing module 200 includes a timer, a Hall-effect sensor, and a strain gauge. The timer records a rotating time of the rotating shaft 12, and generates the rotation time signal. The strain gauge gauges the torque used to tighten the screw, and generates the torque signal. The Hall-effect sensor senses the rotational speed of the rotating shaft 12 fastening the crew, and generates the rotational speed signal. In the first embodiment, the data module 600 and the sensing module 200 make up a torque measuring device (TMD).

In the first embodiment, the processing module 300 further includes an abnormal status unit 310, a repair scheduling unit 320, and an error tolerance unit 330.

The abnormal status unit 310 is tasked to detect any abnormal status in the processing unit 300. When any abnormal status is detected, an abnormal message is created to be displayed on the displaying module 500, and the rotating shaft 12 is forced to stop rotating. More particularly, when the processing unit 300 is fastening the screw, the abnormal status unit 310 inside the processing unit 300 can detect the following abnormal status:

Status 1: when the abnormal status unit 310 determines the revolution number is less than the first revolution number from the configuration data, and the torque value exceeds a second torque value from the configuration data;

Status 2: when the processing module 300 controls the motor module 100 to decelerate to the first rotational speed, and the abnormal status unit 310 determines the torque value exceeds the second torque value from the configuration data;

Status 3: when the abnormal status unit 310 determines the torque value is less than the first torque value from the configuration data, and the rotation time exceeds a first time from the configuration data; and Status 4: when the abnormal status unit 310 determines the torque value is less than the first torque value, and the revolution number exceeds a second revolution number from the configuration data.

Status 1 and 2 mentioned above describe a situation wherein the screw is stuck due to galled threads. Galling of the screw happens when a thread of a screw hole mismatches a thread of the screw due to either wrong thread types or misalignment. Status 3 and 4 mentioned above describe another situation wherein the screw is stripped. The screw is stripped also due to galling of the screw, wherein threads are so damaged that the screw is free to rotate endlessly. When encountering any of status 1 to status 4, the abnormal status unit 310 generates the abnormal message, displays the abnormal message accordingly through those status lights 530 of the display module 500, and stops the rotating shaft 12 from further rotating. A reason to display the abnormal message is for halting the fastening of the screw, either preventing further galling of the screw when the screw is stuck, or preventing meaningless rotation of the screw when the screw is stripped.

In the first embodiment of the present invention, the error tolerance unit 330 records a number of the abnormal messages generated by the abnormal status unit 310 in the processing module 300. The number of the abnormal messages increases when any abnormal status is detected when fastening the screw. When the number of the abnormal messages exceeds an error threshold from the configuration data, the error tolerance unit 330 stops the electric screwdriver 1 from further fastening the screw. In other words, when the abnormal status occurs but is yet to exceed the error threshold, the present invention can still tolerate further attempts to tighten the screw. As a result, the starting switch 13 can be released and then re-pressed to initiate another attempt to tighten the screw. When the abnormal status of the error tolerance unit 330 occurs and exceeds the error threshold, even if the starting switch 13 is released and then re-pressed, the present invention prevents another initiation to tighten the screw. This way the screw and the thread of the screw cannot be further galled and can stay protected.

The repair scheduling unit 320 of the processing module 300 includes a date message and a repair date. When the repair scheduling unit 320 determines the date message equals the repair date, the repair scheduling unit 320 generates a notification message, and displays the notification message through the display module 500. The notification message notifies a user of the present invention to perform maintenance on the electric screwdriver apparatus. In the first embodiment, the notification message is indicated through those status lights 530 of the display module 500.

Figure 3:
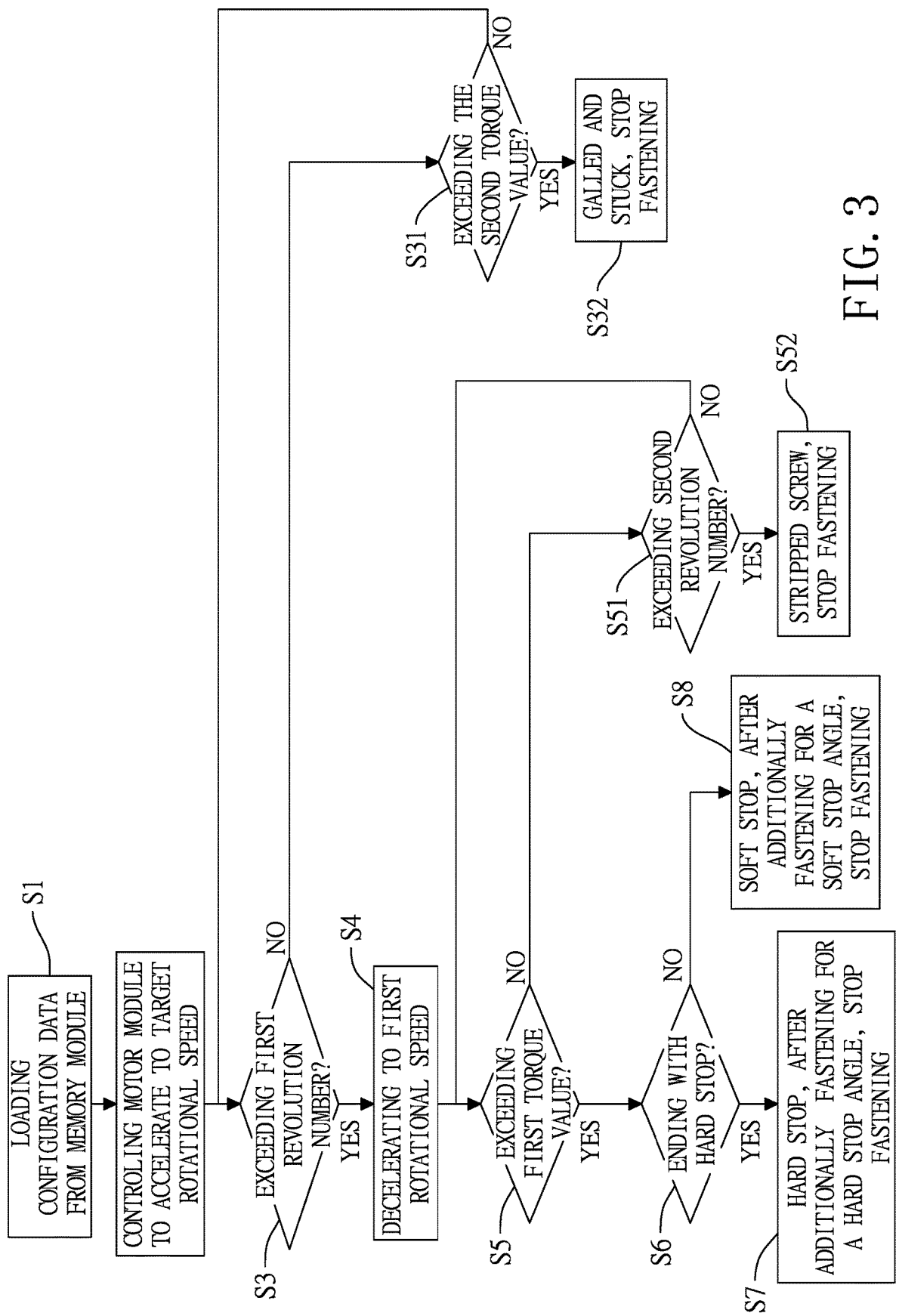
FIG. 3 is a flow chart of an embodiment of an electric screwdriver apparatus control method of the present invention.

With reference to FIG. 3, an electric screwdriver apparatus control method of the present invention is executed by a processing module 300 of a controller 2 of an electric screwdriver apparatus. The electric screwdriver apparatus control method includes the following steps:

Step S1: loading a configuration data from a memory module 400;

Step S2: controlling a motor module 100 of an electric screwdriver 1 of the electric screwdriver apparatus to accelerate to a target rotational speed according to a target rotational speed signal from the configuration data;

Step S3: calculating a revolution number according to a rotation time signal and a rotational speed signal from a sensing module 200, and determining whether the revolution number exceeds a first revolution number from the configuration data;

Step S4: when the revolution number exceeds the first revolution number, controlling the motor module 100 to decelerate to a first rotational speed according to a first rotational speed signal, wherein the first rotational speed is less than the target rotational speed;

Step S5: determining whether a torque value from the sensing module 200 exceeds a first torque value from the configuration data;

Step S6: when the torque value exceeds the first torque value, further determining whether a process of fastening a screw has a hard stop or a soft stop according to the configuration data;

Step S7: when the process of fastening the screw is determined to have a hard stop, controlling the motor module 100 of the electric screwdriver 1 of the electric screwdriver apparatus to additionally rotate for a hard stop angle according to the hard stop angle from the configuration data before stop rotating the screw; and Step S8: when the process of fastening the screw is determined to have a soft stop, controlling the motor module 100 to additionally rotate for a soft stop angle according to the soft stop angle from the configuration data before stopping rotating the screw.

In other words, the configuration data of the memory module 400 includes the target rotational speed, the first revolution number, the first rotational speed, the first torque value, and a determination of whether the process of fastening the screw ends with the hard stop or the soft stop. The determination of whether the process of fastening the screw ends with either the hard stop or the soft stop is included in step S6. The process of fastening the screw either ends with the hard stop or the soft stop as the screw is either able to be tightened further or barely able to be tightened further as the torque value exceeds the first torque value.

In an embodiment of the present invention, the electric screwdriver apparatus control method further includes the following steps:

Step S51: when the torque value is less than the first torque value, further determining whether the revolution number exceeds a second revolution number from the configuration data;

When the torque value is less than the first torque value and the revolution number is also less than the second revolution number, executing step S5; and Step S52: when the torque value is less than the first torque value and the revolution number exceeds the second revolution number, stopping the process of fastening the screw.

Steps S51 and S52 are designed to confirm whether the screw has stripped, since if the screw did, the screw would endlessly rotate as the torque value remains unchanged and the revolution number increases continuously. In this situation, the processing module 300 would stop the process of fastening the screw, and wait for a user to release a starting switch 13 on a screwdriver shell of the electric screwdriver 1 to check on an abnormal status. When the abnormal status is resolved and when the user re-presses the starting switch 13, the processing module 300 receives a starting signal generated from the starting switch 13 to re-start the process of fastening the screw.

Furthermore, the present invention includes the following steps:

Step S31: when the revolution number is less than a first revolution number, determining whether the torque value exceeds a second torque value from the configuration data;

When the revolution number is less than the first revolution number and the torque value is less than the second torque value, executing step S3, wherein the second torque value is greater than the first torque value; and Step S32: when the revolution number is less than the first revolution number and when the torque value exceeds the second torque value, stopping the process of fastening the screw.

Steps S31 and S32 are designed to confirm whether the screw is galled and stuck, since if the screw is stuck, the torque value will increase dramatically. In this situation, the processing module 300 also will stop the process of fastening the screw, to protect the screw from being further galled.

Figure 4:
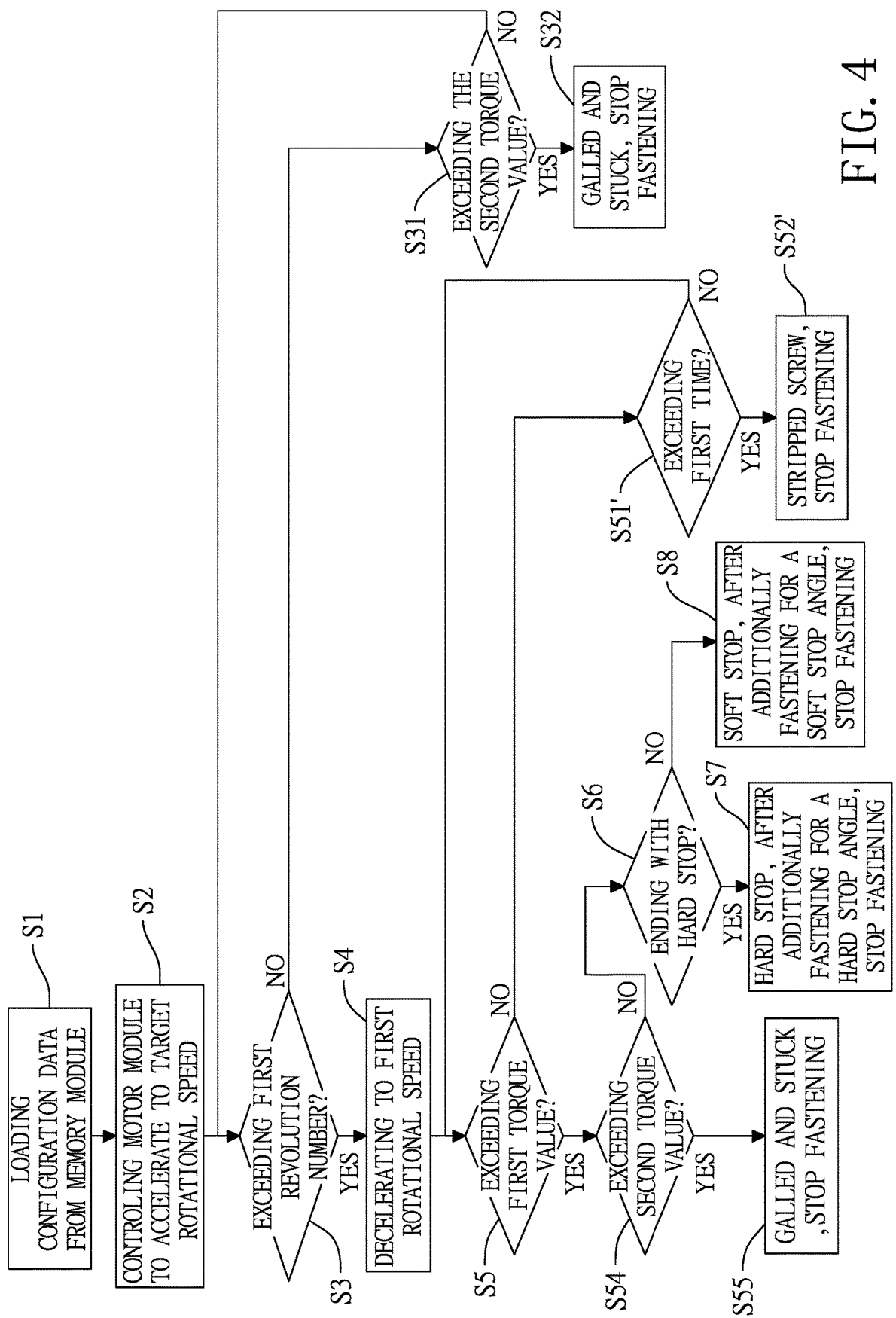
FIG. 4 is a flow chart of a first embodiment of the electric screwdriver apparatus control method of the present invention.

With respect to FIG. 4, in a first embodiment of the present invention, the present invention further includes the following steps:

Step S51': when the torque value is less than the first torque value, further calculating a rotation time according to the rotation time signal from the configuration data and determining whether the rotation time exceeds a first time from the configuration data;

When the torque value is less than the first torque value and the rotation time is less than the first time, executing step S5; and Step S52': when the torque value is less than the first torque value and the rotation time exceeds the first time, stopping the process of fastening the screw.

Steps S51' and S52' are also designed to confirm whether the screw has stripped, since if the screw did, the screw would endlessly rotate and time will be wasted. In this situation, the processing module 300 would stop the process of fastening the screw to prevent a waste of time.

In the first embodiment of the present invention, after step S5 and before step S6, the present invention further includes the following steps:

Step S54: when the torque value exceeds the first torque value, further determining whether the torque value exceeds a second torque value from the configuration data;

When the torque value exceeds the first torque value but is less than the second torque value, executing step S6; and Step S55: when the torque value exceeds both the first torque value and the second torque value, stopping the process of fastening the screw.

Steps S54 and S55 are also designed to confirm whether the screw is galled and stuck, since even if the rotational speed of the process of fastening the screw is the first rotational speed rather than the target rotational speed, the torque value can still increase and exceed the second torque value as the screw can be galled and stuck at any given time. The first rotational speed mentioned above is slower than the target rotational speed. Sometimes the screw can be galled and stuck due to a thread of the screw being already damaged, and since the damaged thread can occur at any part of the screw, it is possible that the screw becomes stuck only much later during the processing of fastening the screw.

The electric screwdriver apparatus of the present invention is able to display and execute the fastening plan of the configuration data as all of the steps of the process of fastening the screw are digitized. The processing module 300 follows the configuration data to execute the fastening plan, to improve upon current technique of fastening the screw. In the electric screwdriver apparatus control method, the processing module 300 follows the above mentioned steps to precisely control the electric screwdriver apparatus, ensuring unified quality for the process of fastening the screw.

What is claimed is:

1. An electric screwdriver apparatus, comprising:
   an electric screwdriver, comprising:
      a screwdriver shell, comprising a hole;
      a rotating shaft, mounted in the screwdriver shell, and protruding out of the hole;
      a motor module, mounted in the screwdriver shell, and driving the rotating shaft to rotate;
      a sensing module, mounted in the screwdriver shell, sensing a rotation time, a rotational speed, and a torque of the rotating shaft, and accordingly generating a rotation time signal, a rotational speed signal, and a torque signal; and
      a starting switch, mounted on the screwdriver shell;
   a controller, electrically connecting the electric screwdriver, and comprising:
      a controller shell;
      a processing module, mounted in the controller shell, and electrically connecting the motor module and the sensing module of the electric screwdriver; wherein the processing module receives the rotation time signal, the rotational speed signal, and the torque signal generated by the sensing module; and wherein the processing module calculates a torque value according to the torque signal, and the processing module calculates the rotation time, a rotational speed value, and a revolution number according to the rotational time signal and the rotational speed signal; and
      a memory module, mounted in the controller shell and electrically connecting the processing module, and storing a configuration data;
   wherein the processing module is electrically connected to the starting switch, and when the processing module detects a starting signal generated by the starting switch, the processing module starts controlling a process of fastening a screw according to the configuration data stored in the memory module;
   wherein after the configuration data is loaded, the processing module controls the motor module to accelerate to a target rotational speed according to the configuration data, and when the revolution number exceeds a first revolution number from the configuration data, the processing module controls the motor module to decelerate to a first rotational speed;
   wherein when the torque value exceeds a first torque value from the configuration data, the processing module determines whether the processing of fastening the screw ends with a hard stop or a soft stop according to the configuration data;
   wherein if the process of fastening the screw ends with the hard stop, the processing module controls the motor module to additionally tighten the screw for a hard stop angle before stopping the process of fastening the screw;
   wherein if the process of fastening the screw ends with the soft stop, the processing module controls the motor module to additionally tighten the screw for a soft stop angle before stopping the process of fastening the screw.

2. The electric screwdriver apparatus as claimed in claim 1, wherein the controller further comprises:
   a display module, mounted in the controller shell, electrically connecting the processing module, and displaying the configuration data and the torque value, the rotation time, the rotational speed value, and the revolution number calculated by the processing module.

3. The electric screwdriver apparatus as claimed in claim 1, wherein the controller further comprises:
   a display module, mounted in the controller shell and electrically connecting the processing module;
   wherein the processing module further comprises:
      an abnormal status unit;
   wherein when the abnormal status unit determines the revolution number is less than the first revolution number from the configuration data, and when the torque value exceeds a second torque value from the configuration data, the abnormal status unit generates an abnormal message, the abnormal message is displayed through the display module, and the rotating shaft is forced to stop rotating;
   wherein when the processing module controls the motor module to decelerate to the first rotational speed, the abnormal status unit determines whether the torque value exceeds the second torque value from the configuration data;
   wherein when the torque value is determined to exceed the second torque value, the abnormal status unit generates the abnormal message, the abnormal message is displayed through the display module, and the rotating shaft is forced to stop rotating;
   wherein when the abnormal status unit determines the torque value is less than the first torque value from the configuration data, and the rotation time exceeds a first revolution time, the abnormal status unit generates the abnormal message, the abnormal message is displayed through the display module, and the rotating shaft is forced to stop rotating; and
   wherein when the abnormal status unit determines the torque value is less than the first torque value from the configuration data, and the rotation time exceeds a second revolution time, the abnormal status unit generates the abnormal message, the abnormal message is displayed through the display module, and the rotating shaft is forced to stop rotating.

4. The electric screwdriver apparatus as claimed in claim 1, wherein the controller further comprises:
   a display module, mounted in the controller shell, and electrically connecting the processing module;
   wherein the processing module further comprises:
      a repair scheduling unit, comprising a date message and a repair date;
   wherein when the repair scheduling unit determines the date message equals the repair date, the repair scheduling unit generates a notification message, and the notification message is displayed through the display module.

5. The electric screwdriver apparatus as claimed in claim 3, wherein the processing module further comprises:
an error tolerance unit, recording a number of the abnormal messages; when the number of the abnormal messages exceeds an error threshold from the configuration data, the error tolerance unit stops the electric screwdriver from further fastening the screw.

6. The electric screwdriver apparatus as claimed in claim 1, wherein the electric screwdriver further comprises:
a data module, mounted in the screwdriver shell and electrically connecting the sensing module and the processing module;
wherein the data module receives the rotation time signal, the rotational speed signal, and the torque signal from the sensing module, and digitizes each signal respectively; after digitization, the data module outputs the rotation time signal, the rotational speed signal, and the torque signal to the processing module.

7. An electric screwdriver apparatus control method, executed by a processing module of a controller of an electric screwdriver apparatus, and comprising the following steps:
step S1: loading a configuration data from a memory module;
step S2: accelerating a rotational speed of a motor module of an electric screwdriver of the electric screwdriver apparatus to a target rotational speed according to a target rotational speed signal from the configuration data;
step S3: calculating a revolution number according to a rotation time signal and a rotational speed signal from the sensing module, and determining whether the revolution number exceeds a first revolution number from the configuration data;
step S4: when the revolution number exceeds the first revolution number, controlling the rotational speed of the motor module to decelerate to a first rotational speed according to a first rotational speed signal from the configuration data; wherein the first rotational speed is slower than the target rotational speed;
step S5: according to a torque value sensed by the sensing module, determining whether the torque value exceeds a first torque value from the configuration data;
step S6: when the torque value exceeds the first torque value, determining whether a fastening process of a screw ends with a hard stop or a soft stop according to the configuration data;
step S7: when the fastening process is determined to end with the hard stop, controlling the motor module of the electric screwdriver of the electric screwdriver apparatus to stop fastening the screw after additionally fastening for a hard stop angle according to the configuration data; and
step S8: when the fastening process is determined to end with the soft stop, controlling the motor module of the electric screwdriver of the electric screwdriver apparatus to stop fastening the screw after additionally fastening for a soft stop angle according to the configuration data; wherein the soft stop angle is wider than the hard stop angle.

8. The electric screwdriver apparatus control method as claimed in claim 7, further comprising the following steps:
step S51: when the torque value is less than the first torque value, further determining whether the revolution number exceeds a second revolution number from the configuration data;
wherein when the torque value is less than the first torque value and the revolution number is also less than the second revolution number, executing step S5;
step S52: when the torque value is less than the first torque value and the revolution number exceeds the second revolution number, stopping the process of fastening the screw.

9. The electric screwdriver apparatus control method as claimed in claim 7, further comprising the following steps:
step S51': when the torque value is less than the first torque value, further calculating a rotation time according to the rotation time signal from the configuration data and determining whether the rotation time exceeds a first time from the configuration data;
wherein when the torque value is less than the first torque value and the rotation time is less than the first time, executing step S5;
step S52': when the torque value is less than the first torque value and the rotation time exceeds the first time, stopping the process of fastening the screw.

10. The electric screwdriver apparatus control method as claimed in claim 7, further comprising the following steps:
step S31: when the revolution number is less than the first revolution number, determining whether the torque value exceeds a second torque value from the configuration data;
wherein when the revolution number is less than the first revolution number and the torque value is less than the second torque value, executing step S3, wherein the second torque value is greater than the first torque value;
step S32: when the revolution number is less than the first revolution number and when the torque value exceeds the second torque value, stopping the process of fastening the screw.

11. The electric screwdriver apparatus control method as claimed in claim 7, further comprising the following steps after step S5 and before step S6:
step S54: when the torque value exceeds the first torque value, further determining whether the torque value exceeds a second torque value from the configuration data;
wherein when the torque value exceeds the first torque value but is less than the second torque value, executing step S6;
step S55: when the torque value exceeds both the first torque value and the second torque value, stopping the process of fastening the screw.

* * * * *